United States Patent [19]

Corley

[11] Patent Number: 4,503,200

[45] Date of Patent: Mar. 5, 1985

[54] HEAT CURABLE POLYEPOXIDE RESIN BLENDS

[75] Inventor: Larry S. Corley, Houston, Tex.

[73] Assignee: Shell Oil Company, Houston, Tex.

[21] Appl. No.: 594,402

[22] Filed: Mar. 27, 1984

Related U.S. Application Data

[63] Continuation of Ser. No. 399,576, Jul. 19, 1982, abandoned.

[51] Int. Cl.$^3$ .................... C08G 59/16; C08F 283/10
[52] U.S. Cl. ..................................... 525/532; 525/529; 525/530
[58] Field of Search ................. 525/529, 530, 532

[56] References Cited

U.S. PATENT DOCUMENTS

| | | | |
|---|---|---|---|
| 2,633,458 | 3/1953 | Shokal | 260/45.2 |
| 2,658,885 | 11/1953 | D'Alelio | 260/53 |
| 2,691,007 | 10/1954 | Cass | 260/45.4 |
| 2,939,859 | 6/1960 | Rumscheidt et al. | 260/45.5 |
| 3,009,898 | 11/1961 | Meyer et al. | 260/45.5 |
| 3,099,638 | 7/1963 | Foster | 260/45.5 |
| 3,336,241 | 8/1967 | Shokal | 260/2 |
| 3,356,624 | 12/1967 | Neal et al. | 260/18 |
| 3,408,219 | 10/1968 | Neal et al. | 117/37 |
| 3,446,762 | 5/1969 | Lopez et al. | 260/18 |
| 3,574,157 | 4/1971 | Markus | 260/28.5 |
| 3,634,542 | 1/1972 | Dowd et al. | 260/837 R |
| 3,637,618 | 1/1972 | May | 260/837 R |
| 4,010,289 | 3/1977 | Kobayashi et al. | 525/531 |
| 4,284,753 | 8/1981 | Hewitt, Jr. | 528/89 |

FOREIGN PATENT DOCUMENTS 18401 2/1980 Japan ..................... 525/529

*Primary Examiner*—John C. Bleutge
*Assistant Examiner*—Robert E. L. Sellers, II
*Attorney, Agent, or Firm*—Dean F. Vance

[57] ABSTRACT

The present invention is directed to a heat-curable composition comprising:
(1) a polyepoxide,
(2) at least one unsaturated monomer (e.g., esters of ethylenically unsaturated monocarboxylic acids),
(3) an acid anhydride,
(4) at least one epoxy curing accelerator (onium salts such as ethyl triphenyl phosphonium iodide) and
(5) a free radical initiator.

11 Claims, No Drawings

HEAT CURABLE POLYEPOXIDE RESIN BLENDS

This is a continuation of application Ser. No. 399,576 filed July 19, 1982.

BACKGROUND OF THE INVENTION

Curable compositions comprising polyester resins and styrene have generally been epoxy polyester (vinyl ester) compositions wherein a portion of the polyester is replaced with styrene or other ethylenically unsaturated monomer. See, for example, U.S. Pat. No. 2,691,007, U.S. Pat. No. 3,574,157 and U.S. Pat. No. 3,634,542.

Polyether resin and styrene blends are also known. These blends generally exhibit poor processability, short pot life, high viscosity and cure with conventional curing agents to produce products which do not exhibit good physical properties, such as high heat deflection temperatures and retention of physical properties at elevated temperatures. See, for example, U.S. Pat. No. 2,939,859 directed to a polyepoxide/styrene blend cured with peroxides and/or amines. While the compositions of U.S. Pat. No. 2,939,859 do exhibit a reduction of viscosity over an epoxy composition alone, the resulting products do not exhibit high heat deflection temperatures.

Other patents covering polyepoxide/styrene compositions include U.S. Pat. No. 3,009,898, which are directed to the use of anhydride curing agents, optionally in the presence of a peroxide and/or tertiary amine accelerator.

Epoxy/styrene blends which can be cured with a special curing agent/curing accelerator blend, e.g., an acid anhydride in combination with an onium salt, to yield products which exhibit improved physical properties, especially increased heat deflection temperatures and excellent retention of physical properties at elevated temperatures are disclosed and claimed in U.S. Pat. No. 4,284,753, issued Aug. 18, 1981.

It was discovered that the aromatic monomer (styrene) can be blended with a number of other comonomers in the composition of U.S. Pat. No. 4,284,753 to yield products which exhibit improved physical properties. These compositions are disclosed and claimed in copending patent application Ser. No. 387,998, filed June 14, 1982 now abandoned and refiled on Apr. 9, 1984 as U.S. Ser. No. 598,392.

It has now been discovered that very suitable compositions having excellent chemical and physical properties can be prepared wherein the aromatic monomer is replaced entirely with one or more of the comonomers which were blended with the styrene in the aforementioned copending patent application.

SUMMARY OF THE INVENTION

The present invention is directed to an improved heat-curable epoxy-unsaturated monomer blend composition, which when cured, yields compositions exhibiting improved physical properties such as increased heat deflection temperature, increased flexural strength, and increased flexibility. More particularly, the invention provides a heat-curable composition comprising: (1) a polyepoxide, (2) an unsaturated monomer preferably selected from the group consisting of esters of ethylenically unsaturated monocarboxylic acids (e.g., methyl methacrylate and trimethylolpropane trimethacrylate), cyano-containing compounds (e.g., acrylonitrile), allyl compounds and unsaturated aliphatic compounds (e.g., butylene, isoprene, etc.), (3) a carboxyl-containing compound, (4) a curing accelerator composition containing at least one epoxy curing accelerator and (5) a free-radical curing agent. These epoxy-unsaturated comonomer blend compositions are especially suitable for use in sheet molding compositions (SMC), and in structural applications such as automotive springs, bumpers, drive shafts, etc., as well as in reaction injection molding (RIM) applications.

DESCRIPTION OF THE PREFERRED EMBODIMENTS

It has now been found that heat curable compositions exhibiting improved physical properties, particularly improved heat deflection temperatures, increased flexural strength and increased flexibility, are obtained from blends of polyepoxides and unsaturated monomers using a unique combination of curing and accelerator mechanisms.

Accordingly, the present invention comprises a blend of (1) from about 30 to about 99 parts by weight of a polyepoxide, especially a normally liquid polyepoxide.

(2) from about 1 to about 70 parts by weight of at least one unsaturated monomer selected from the group consisting of lower molecular weight esters of ethylenically unsaturated monocarboxylic acids (e.g., methyl methacrylate), cyano-compounds (e.g., acrylonitrile), allyl compounds (e.g., triallyl isocyanurate) and unsaturated aliphatic compounds (olefins and diolefins), (3) from about 0.25 to about 2.0 stoichiometric equivalents based on the polyepoxide of a carboxyl-containing compound, especially a polycarboxylic acid anhydride, (4) at least one epoxy curing accelerator preferably selected from the group consisting of (a) onium compounds (b) stannous salts of monocarboxylic acids, (c) alkali metal hydroxides, (d) alkaline earth hydroxides, and (e) alkali metal salts, and (5) a curing amount of a free-radical curing agent (initiator).

Polyepoxides

The polyepoxides used to prepare the instant compositions comprise those compounds containing at least one vicinal epoxy group; i.e., at least one

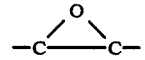

group. These polyepoxides may be saturated or unsaturated, aliphatic, cycloaliphatic, aromatic or heterocyclic and may be substituted if desired with non-interfering substituents such as halogen atoms, hydroxyl groups, ether radicals, and the like. They may also be monomeric or polymeric.

For clarity, many of the polyepoxides and particularly those of the polymeric type are described in terms of epoxy equivalent values. The meaning of this expression is described in U.S. Pat. No. 2,633,458. The polyepoxides used in the present process are preferably those having an epoxy equivalency greater than 1.0.

Various examples of liquid polyepoxides that may be used in the process of the invention are given in U.S. Pat. No. 2,633,458 and it is to be understood that the disclosure of that patent relative to examples of polyepoxides is incorporated by reference into this specification.

Other suitable polyepoxides are disclosed in U.S. Pat. No. 3,356,624, U.S. Pat. No. 3,408,219, U.S. Pat. No. 3,446,762, and U.S. Pat. No. 3,637,618 and the disclosure of these patents relevant to examples of epoxy compounds is incorporated by reference into this specification.

Preferred polyepoxides are the glycidyl polyethers of polyhydric phenols and polyhydric alcohols, especially the glycidyl polyethers of 2,2-bis(4-hydroxyphenyl)propane having an average molecular weight between about 300 and 3,000 and an epoxide equivalent weight between about 140 and 2,000 and more preferably an average molecular weight of from about 300 and about 1000 and an epoxide equivalent weight of from about 140 to about 650.

Other suitable epoxy compounds include those compounds derived from polyhydric phenols and having at least one vicinal epoxy group wherein the carbon-to-carbon bonds within the six-membered ring are saturated. Such epoxy resins may be obtained by at least two well-known techniques, i.e., by the hydrogenation of glycidyl polyethers of polyhydric phenols or by the reaction of hydrogenated polyhydric phenols with epichlorohydrin in the presence of a suitable catalyst such as a Lewis acid, e.g., boron trihalides and complexes thereof, and subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium and/or ruthenium supported on an inert carrier at a temperature below about 50° C. This method is thoroughly dislcosed and described in U.S. Pat. No. 3,336,241, issued Aug. 15, 1967.

The hydrogenated epoxy compounds prepared by the process disclosed in U.S. Pat. No. 3,336,241 are suitable for use in the present compositions. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as BF$_3$, followed by dehydrohalogenation in the presence of caustic. When the hydrogenated phenol is hydrogenated Bisphenol A, the resulting saturated epoxy compound is sometimes referred to as "diepoxidized hydrogenated Bisphenol A", or more properly as the diglycidyl ether of 2,2-bis(4-cyclohexanol)propane.

In any event, the term "saturated epoxy resin", as used herein shall be deemed to mean the glycidyl ethers of polyhydric phenols wherein the aromatic rings of the phenols have been or are saturated.

Preferred saturated epoxy resins are the hydrogenated resins prepared by the process described in U.S. Pat. No. 3,336,241. Especially preferred are the hydrogenated glycidyl ethers of 2,2-bis(4-hydroxyphenol)-propane, sometimes called the diglycidyl ethers of 2,2-bis(4-cyclohexanol)propane.

Other examples of suitable polyepoxides include the glycidyl ethers of novolac resins, described in U.S. Pat. No. 2,658,885.

For most applications it is desirable to utilize an epoxy resin which is liquid or semi-liquid under the conditions of application. Accordingly, a blend of a liquid and solid resins may be employed.

Monomers

As noted hereinbefore, the unsaturated monomer is blended with up to 50% by weight of one or more other comonomers, including, among others, (1) esters of ethylenically unsaturated carboxylic acids, (2) cyano-containing compounds, (3) allyl-containing compounds, and (4) olefins and diolefins.

Suitable unsaturated monocarboxylic acid esters include the alkyl esters of ethylenically unsaturated acids such as acrylic acid, methacrylic acid, crotonic acid, alpha-phenylacrylic acid, alpha-cyclohexylacrylic acid, maleic acid, cyanoacrylic acid, methoxyacrylic acid, and the like. Very preferred acids are acrylic acid and methacrylic acid. Accordingly, suitable such esters include, methyl methacrylate, ethyl acrylate, butyl acrylate, butyl methacrylate, isobutyl methacrylate, and the like wherein side chains may contain halogen, e.g. 2,3-dibromopropyl acrylate, pentachlorophenyl methacrylate, etc.

Very preferred comonomers include the polyacrylate and polymethacrylate esters of polyols containing more than one terminal acrylate or methacrylate group. These esters are the acrylic and methacrylic acid esters of aliphatic polyhydric alcohols such as, for example, the di- and polyacrylates and the di- and polymethacrylates of alkylene glycols, polyoxyalkylene glycols, alicyclic glycols and higher polyols, such as ethylene glycol, triethylene glycol, tetraethylene glycol, tetramethylene glycol, hexanediol, trimethylolethane, trimethylolpropane, pentaerythritol, dipentaerythritol, tripentaerythritol and the like, or mixtures of these with each other or with their partially esterified analogs.

Typical compounds include but are not limited to trimethylolpropane triacrylate, trimethylolethane triacrylate, trimethylolpropane trimethacrylate, trimethylolethane trimethacrylate, tetramethylene glycol dimethacrylate, ethylene glycol dimethacrylate, triethylene glycol dimethacrylate, pentaerythritol triacrylate, pentaerythritol tetraacrylate, 1,6-hexanediol diacrylate, 1,6-hexanediol dimethacrylate, dipentaerythritol tetraacrylate, dipentaerythritol pentaacrylate, and the like. Particularly preferred esters are neopentyl glycol dimethacrylate, trimethylolpropane trimethacrylate, trimethylolpropane triacrylate, pentaerythritol triacrylate, and 1,3-butylene dimethacrylate.

Additional acrylate or methacrylate esters of polyols are the acrylate or methacrylate esters of epoxide resins, wherein epoxide resins as used herein are considered to be polyols. The epoxide resins useful in reacting with acrylic or methacrylic acid are those epoxide resins described hereinbefore. The procedures for preparing these acrylate and methacrylate esters of epoxide resins are described in U.S. Pat. No. 3,377,406 which is hereby incorporated by reference.

Suitable cyano-compounds are acrylonitrile, methacrylonitrile, and halogenated acrylonitrile, etc.

Suitable allyl monomers include diallyl phthalate, triallyl isocyanurate, diallyl isophtholate, allyl diglycol carbonate, etc.

Other suitable unsaturated comonomers include the unsaturated aliphatic compounds such as the olefins and diolefins. Operable such olefins and diolefins include ethylene, propylene, butylene, amylene, butadiene, isoprene and the like. It will be appreciated that since these monomers are normally gases at ambient temperatures and pressures, their use dictate that the compositions be formulated and cured under pressure conditions. Accordingly, their use is especially useful in the so-called reaction injection molding (RIM) techniques.

Epoxy Monomer Blends

Usable blends of the polyepoxide and other monomers will range from about 30% to 99% polyepoxide and from about 1% to about 70% other monomers as a weight basis. An especially preferred range is from about 50% to about 85% polyepoxide and from about 15% to about 50% other monomers.

Polycarboxyl-Containing Curing Agents

Suitable carboxyl-containing compounds include the saturated and unsaturated aliphatic, aromatic and cycloaliphatic polycarboxylic acids and polycarboxylic acid anhydrides, which compounds may be substituted with halogen atoms and the like.

Typical such carboxyl-containing compounds are trimellitic anhydride, maleic acid, maleic anhydride, crotonic acid, itaconic acid, itaconic anhydride, tetrahydrophthalic acid, fumaric acid, phthalic anhydride, isophthalic acid, terephthalic acid, hexahydrophthalic anhydride, dianhydride ester of trimellitic anhydride with ethylene glycol, dodecenyl succinic anhydride, dichloromaleic anhydride, tetrachlorophthalic anhydride, chlorendic anhydride, pyromellitic dianhydride, dimethylmaleic anhydride, n-butylmaleic anhydride, phenylmaleic anhydride, bromophenylmaleic anhydride, chlorendic anhydride, 3,3', 4,4'-benzophenone tetracarboxylic dianhydride, and the like.

Preferred polycarboxylic acids and anhydrides include the normally solid acids and anhydrides having a melting point between about 150° C. and 250° C. Very suitable such acids and anhydrides include trimellitic anhydride, 3,3',4,4'-benzophenone tetracarboxylic dianhydride, chlorendic anhydride, and thiodisuccinic anhydride.

Outstanding results are obained when trimellitic anhydride is employed as the epoxy curing agent, particularly when used as finely ground powder.

In general, a curing amount of the acid or anhydride is employed; however, depending upon the polyepoxide employed, the particular acid or anhydride used and end use considerations, the amount may vary over a wide range. A useful range is from about 0.25 to about 2.0 chemical equivalents of acid or anhydride per chemical equivalent of polyepoxide. An especially suitable range when trimellitic anhydride is employed with glycidyl polyethers of BPA is from about 0.75 to about 1.5.

Curing Accelerator Composition

An essential feature of the present composition is the use of at least one epoxy curing accelerator, preferably an "onium" compound. It has been found that an extremely small quantity of an onium compound produces an outstanding improvement in physical properties, particularly increased heat deflection temperature.

Onium Compound

Useful onium compounds include the onium salts utilized as esterification catalysts, and preferably those containing phosphorus, sulfur or nitrogen, such as, for example, the phosphonium, sulfonium, iodonium and ammonium salts of inorganic acids. Examples of these include, among others ethyl triphenyl phosphonium iodide, tetrabutyl ammonium bromide, benzyltrimethylammonium sulfate, tetramethylammonium chloride, benzyltrimethylammonium nitrate, diphenyldimethylammonium chloride, benzyltrimethylammonium chloride, diphenyldimethylammonium nitrate, diphenylmethylsulfonium chloride, tricyclohexylsulfonium bromide; triphenylmethylphosphonium iodide, diethyldibutylphosphonium nitrate, trimethylsulfonium chloride, dicyclohexyldialkylphosphonium iodide, benzyltrimethylammonium thiocyanate, choline chloride, and the like, and mixtures thereof.

Preferred onium salts to be employed include those of the formulae:

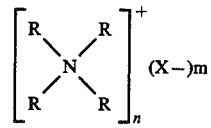

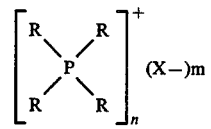

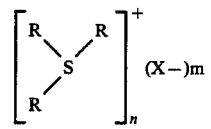

wherein R is a hydrocarbon radical, and preferably an aryl, alkyl, alkenyl, cycloalkyl, cycloalkenyl or alkaryl radical containing up to 22 carbon atoms, X is an ion of an inorganic acid, and particularly a halogen atom, nitrate, sulfate or phosphate radical, m is the valency of the X ion and n=m.

Especially preferred onium salts are the alkyl triphenylphosphonium halides such as ethyl triphenyl phosphonium iodide; quaternary ammonium halides such as tetramethyl ammonium chloride and tetrabutyl ammonium bromide.

As noted hereinbefore, the amount of onium salt can vary over a wide range, i.e., from about 0.001 to about 10.0 parts by weight per 100 parts by weight of the polyepoxide (phr). A very useful range is from about 0.005 to about 2.0 phr.

Suitable other accelerators which may be used above or in combination with onium salts or other accelerators include the stannous salts of monocarboxylic acids having at least 2 carbon atoms, and more preferably from about 6 to 12 carbon atoms. Examples of operable stannous salts include, among others, stannous caproate, stannous octoate, stannous laurate, stannous palmitate, stannous stearate, stannous oleate and stannous naphthenate. Stannous octoate is particularly preferred.

Other suitable curing accelerators include the alkali metal salts such as sodium benzoate, lithium benzoate, lithium octoate, lithium naphthenate, lithium stearate, lithium neodecanoate, lithium iodide, potassium iodide, lithium bromide, and the like.

Still other suitable curing accelerators (catalysts) include the hydroxides, alkoxides and carboxylates of the alkaline earth and alkali metals such as sodium hydroxide, potassium hydroxide, calcium hydroxide, sodium methoxide, lithium carboxylates, etc.

The amount of co-accelerator may vary within wide limits from about 0.01 to about 10 parts per hundred by weight of polyepoxide (phr), and preferably from about 0.05 to 5.0 phr.

Free-Radical Curing Agents

Examples of such catalysts include the peroxides, such as benzoyl peroxide, tertiary butyl hydroperoxide, ditertiary butyl peroxide, hydrogen peroxide, potassium persulfate, methyl cyclohexyl peroxide, cumene hydroperoxide, acetyl benzoyl peroxide, Tetralin hydroperoxide, phenylcyclohexane hydroperoxide, tertiary butyl peracetate, dicumyl peroxide, tertiary butyl perbenzoate, ditertiary amyl perphthalate, ditertiary butyl peradipate, tertiary amyl percarbonate, and the like, and mixtures thereof; azo compounds such as 2,2'-azobisisobutyronitrile, dimethyl 2,2'-azobisisobutyrate, 2,2'-azobis(2,4-dimethylvaleronitrile), 2,2'-azobisisobutyramide, and the like. Particularly preferred catalysts include the dialkyl peroxides, tertiary alkyl hydroperoxides, alkyl esters of peroxycarboxylic acids and particularly those of the above noted groups which contain no more than 18 carbon atoms per molecule and which have a half-life of at least one hour at 125° C.

An especially useful peroxide is 2,5-dimethyl-2,5-bis(-tertiarybutylperoxy)hexane.

It will be appreciated that the amount of free-radical catalyst (curing agent) will vary over a broad range depending upon the amount of the particular vinyl monomer used, type of peroxide and end-use properties, etc. In general, an effective or curing amount is employed. One skilled in the art would simply adjust the amounts of a particular peroxide to suit his process conditions. Such adjustments are made in one or two runs knowing the temperatures, half-lives, etc.

The present compositions may be prepared by various techniques. If, for example, the instant compositions are to be utilized within a short time, they can be prepared by simply mixing all the components, adding the customary additives such as fillers, reinforcement fibers, pigments, flame retardant agents, etc. and then molding and curing the resulting composition.

Under certain conditions, it may be desirable to utilize a two-package system wherein the epoxy-comonomer blend is one package and the other package comprises the curing agents and accelerators. Under other conditions, it may be desirable to mix the epoxy curing agent-accelerators blend into the comonomer for subsequent reaction with the polyepoxide in the presence of the peroxide. Another method comprises a two package system wherein the monomer mixture, accelerator, and curing agent is in one package and the epoxy-peroxide mixture is in another package, which are blended prior to use. Various other modifications will become apparent to one skilled in the art.

One special modification comprises mixing and dispersing the finely powdered anhydride into the unsaturated comonomer to form a paste, thereby reducing dust generation by loose anhydride powder during handling.

As noted hereinbefore, other materials may be mixed or added, including, plasticizers, stabilizers, extenders, oils, resins, tars, asphalts, pigments, reinforcing agents, thixotropic agents, antioxidants, and the like.

The present compositions may be utilized in many applications such as for coatings and impregnating compositions in the preparation of adhesives for metals, wood, cement and the like, and in the preparation of reinforced composite products, such as laminated products, filament windings, sheet molding compounds (SMC), electrical laminates, molding powders, fluidized bed powders, potting compounds, etc. A very suitable application is in the preparation of reinforced products and laminates wherein the compositions are applied to fibrous products such as glass fibers or sheets and the material formed into the desired object and cured.

The following examples are given to illustrate the preparation of the instant heat-curable thermosetting compositions. It is understood that the examples are embodiments only and are given for the purpose of illustration and the invention is not to be regarded as limited to any specific components and/or specific conditions recited therein. Unless otherwise indicated, parts and percentages in the examples, are parts and percentages by weight.

Epoxy Resin A is a liquid glycidyl polyether of 2,2-bis(4-hydroxyphenyl)propane having an epoxide equivalent weight of 180–195 and an average molecular weight of about 380.

Epoxy Resin B is a liquid glycidyl polyether of 2,2-bis(4-hydroxyphenyl)propane having an epoxide equivalent weight of 190–210 and an average molecular weight of about 400.

Epoxy Resin C is a saturated glycidyl polyether of hydrogenated 2,2-bis(4-hydroxyphenyl)propane having an epoxide equivalent weight of 180–195 and an average molecular weight of about 350.

BTDA is 3,3',4,4'-benzophenone tetracarboxylic dianhydride.

LUPERSOL 101 is 2,5-dimethyl-2,5-bis(t-butylperoxy)-hexane.

TMA is trimellitic anhydride.

TMAC is tetramethyl ammonium chloride.

ETPPI is ethyl triphenyl phosphonium iodide.

DICUP is dicumyl peroxide.

TBPB is tertiary butyl peroxybenzoate.

TBAB is tetrabutyl ammonium bromide.

BARQUAT MB-80 is a long chain ($C_{14}$–$C_{16}$) alkyl-dimethyl benzyl ammonium chloride, 80% in alcohol.

PETA is pentaerythritol triacrylate.

TMPTMA is trimethylolpropane trimethacrylate.

BMA is n-butyl methacrylate.

IBMA is isobutyl methacrylate.

TTEGDMA is tetraethylene glycol dimethacrylate.

A464 is ADOGEN 464, a methyltrialkylammonium chloride such that the three alkyl groups have eight to ten carbon atoms each.

EXAMPLE I

This example illustrates the preparation of the present compositions.

Trimellitic anhydride (150 grams) was combined in a 1 quart metal paint can with 1,3-butylene dimethacrylate (300 grams) and Barquat MB-80 (3 grams). This mixture (component B) was mixed with a rotary agitator for approximately 5 minutes until a pourable suspension was obtained. The suspension was allowed to stand overnight and then was combined with a mixture (component A) of 300 grams of Epoxy Resin B and 2 grams of Lupersol 101. This mixture was mixed for approximately 5 minutes and then poured into a mold of glass sheets separated by a Teflon spacer ⅛" thick. Another portion was poured into aluminium molds containing a linear cavity ½" square to form a bar. The sheet and bar molds were placed in an oven at 150° C. for two hours.

The sheets and bars were then removed from the molds and tested for mechanical properties. This procedure was essentially repeated wherein varying amounts of BDMA were used. The mechanical properties for five representative experiments are tabulated in Table I wherein the base formulations were as follows:

| Component A | Component B |
|---|---|
| Epoxy Resin B 300 grams | TMA 150 grams |
| Lupersol 101 2 grams | BDMA variable |
| | Barquat MB-80 3 grams |

Representative experimental runs are tabulated in Table II. Experiment No. 4 is a comparative run using styrene.

EXAMPLE IV

The procedures of Examples I, II and III were essentially repeated wherein various amounts of BMA were utilized. The results are tabulated in Table III.

EXAMPLE V

The procedures of Examples I, II, III and IV were essentially repeated wherein the following base formulation was used:

TABLE I

| BDMA (phr)* | HDT, 264 psi (°C.) | R.T. Flex Strength, MPa | R.T. Flex Modulus, MPa | 149° C. Flex Strength, MPa | 149° C. Flex Modulus, MPa | R.T. Tensile Strength, MPa | R.T. Tensile Modulus, MPa | R.T. Tensile Elongation, MPa | 149° C. Tensile Strength, MPa | 149° C. Tensile Modulus, MPa | 149° C. Tensile Elongation, % |
|---|---|---|---|---|---|---|---|---|---|---|---|
| 11.1 | 166 | 53 | 3440 | 50 | 1730 | 18 | 3480 | 0.6 | 26 | 1640 | 4.0 |
| 25 | 169 | 92 | 3510 | 50 | 1740 | 56 | 3250 | 2.1 | 27 | 1620 | 6.2 |
| 42.7 | 164 | 128 | 3520 | 54 | 1760 | 47 | 3910 | 1.4 | 29 | 1770 | 4.8 |
| 66.6 | 161 | 105 | 3520 | 58 | 1830 | 36 | 3270 | 1.2 | 32 | 1810 | 3.7 |
| 100 | 158 | 123 | 3560 | 61 | 1880 | 61 | 3330 | 2.3 | 28 | 1604 | 3.1 |

*Parts by weight per 100 parts of Epoxy Resin B

EXAMPLE II

Trimellitic anhydride (45 grams) was combined in a jar with trimethylolpropane trimethacrylate (54 grams) and the mixture was blended for approximately 5 minutes with a rotary agitator until a pourable suspension was obtained. To the suspension were added 300 g of Epoxy Resin B, 3 g of stannous octoate and 1.5 g of Lupersol 101. This mixture was mixed for approximately 5 minutes and then poured into molds as in Example I. The molds were placed in an oven at 150° C. for 2 hours for curing. The casting samples had a heat deflection temperature (at 264 psi) of 139° C., room temperature flexural strength and modulus of 106 MPa and 3390 MPa respectively, and flexural strength and modulus at 149° C. of 28 MPa and 870 MPa respectively.

EXAMPLE III

The procedures of Examples I and II were essentially repeated wherein varying amounts of BMA and IBMA were used and the anhydride is BTDA. The amounts of BMA and IBMA are in phr (parts per hundred) based on 100 parts of Epoxy Resin A. All samples were cured at 150° C. for two hours.

Epoxy Resin A or B: 300 grams
Trimellitic Anhydride: 150 grams
ETPPI or TBAB: 1.5 grams
Monomer(s): variable
Lupersol 101: 0.6 grams
Epoxy Resin A was used when TBAB was used and Epoxy Resin B was used with ETPPI.

Representative laboratory runs are tabulated in Table IV. Experiments #8 and 15 are comparative runs using styrene.

EXAMPLE VI

The procedures of the prior examples were essentially repeated wherein various miscellaneous monomers were used. The formulation was as follows:
Epoxy Resin B: 300 grams
TMA: 150 grams
Monomer: Variable
Quaternary Compound: Variable
Lupersol 101: Variable
The results of representative laboratory experiments were tabulated in Table V.

EXAMPLE VII

The procedures of the above examples were essentially repeated wherein various monomers were used. The results of representative experimental runs are tabulated in Table VI.

TABLE II

| Experiment No. | BTDA (phr) | Monomer (phr)$^a$ | Catalyst/ Initiator (phr)$^b$ | Visc. 20° C. (Pa · s) | HDT, 264 psi (°C.) | R.T. Flex Str., MPa | R.T. Flex Mod., MPa | 149° C. Flex Str., MPa | 149° C. Flex Mod., MPa | R.T. Ten. Str., MPa |
|---|---|---|---|---|---|---|---|---|---|---|
| 1 | 70 | BMA(30) | TBAB(0.5) L101(0.2) | 3.03 | $^d$ | 28 | 2820 | 7 | 1090 | 14 |
| 2 | 75 | BMA(30) | TBAB(0.5) L101(0.2) | 4.25 | 218 | 21 | 1470 | 10 | 1280 | 14 |
| 3 | 80 | BMA(30) | TBAB(0.5) L101(0.2) | 5.03 | 210 | 25 | 3010 | 9 | 1420 | 13 |
| 4 | 50 (TMA) | Styrene(25) Control | ETPPI(1.0) L101(0.2) | | 173, 177 | 129 | 3320 | 50 | 1390 | 44 |
| 5 | 85.6 | IBMA(25) | TBAB(0.5) L101(0.2) | | 193, 197 | | | | | |
| 6 | 85.6 | BMA(30) | L101(0.2) | | 202 | | | | | |
| 7 | 85.6 | BMA(30) | L101(0.2) | | 186 | 43 | 2950 | 24$^e$ | 1360$^e$ | 30 |

TABLE II-continued

TBAB(0.5)

| Experiment No. | BTDA (phr) | Monomer (phr)[a] | Catalyst/ Initiator (phr)[b] | R.T. Ten. Mod., MPa | R.T. Ten. Elong., % | 149° C. Ten. Str., MPa | 149° C. Ten. Mod., MPa | 149° C. Ten. Elong., % | Tg, °C. Rheometrics disp. phase (resin phase) |
|---|---|---|---|---|---|---|---|---|---|
| 1 | 70 | BMA(30) | TBAB(0.5) L101(0.2) | 3140 | 0.5 | 5.3 | 1150 | 0.5 | (>230) |
| 2 | 75 | BMA(30) | TBAB(0.5) L101(0.2) | 3090 | 0.5 | 5.4 | 1210 | 0.5 | (>230) |
| 3 | 80 | BMA(30) | TBAB(0.5) L101(0.2) | 2890 | 0.5 | 4.5 | 1270 | 0.4 | (>230) |
| 4 | 50 (TMA) | Styrene(25) Control | ETPPI(1.0) L101(0.2) | 3230 | 3.9 | 26 | 1330 | 7.0 | 103(194) |
| 5 | 85.6 | IBMA(25) | TBAB(0.5) L101(0.2) | | | | | | |
| 6 | 85.6 | BMA(30) | L101(0.2) | | | | | | |
| 7 | 85.6 | BMA(30) | L101(0.2) TBAB(0.5) | 2820 | 1.3 | 17[e] | 1330[e] | 1.6[e] | |

[a]Epoxy Resin A (100 phr) used as base for all formulations. All samples cured 2 hours at 150° C.
[b]BMA = n-butyl methacrylate;
IBMA = isobutyl methacrylate.
[c]TMAC = tetramethylammonium chloride (50% aqueous).
SO = stannous octoate.
L101 = Lupersol 101 (2,5-dimethyl-2,5-bis(t-butyl peroxy)hexane).
TBAB = Tetrabutylammonium bromide.
[d]HDT bars broke during testing.
[e]Values determined at 121° C. instead of 149° C.

TABLE III

| Experiment No. | BTDA (phr) | Monomer (phr)[a] | Catalyst/ Initiator (phr)[b] | Visc. 20° C. (Pa·s) | HDT, 264 psi (°C.) | R.T. Flex Str., MPa | R.T. Flex Mod., MPa | 149° C. Flex Str., MPa | 149° C. Flex Mod., MPa |
|---|---|---|---|---|---|---|---|---|---|
| 1 | 85.6 | BMA(11.1) | TBAB(0.5) L101(0.33) | 26.0 | 225, 237 | 48 | 3590 | 21 | 2030 |
| 2 | 85.6 | BMA(25) | TBAB(0.5) L101(0.33) | 17.5 | 218, 219 | 25 | 2910 | 18 | 1690 |
| 3 | 85.6 | BMA(42.8) | TBAB(0.5) L101(0.33) | 7.8 | 208, 215 | 27 | 2650 | 16 | 1410 |
| 4 | 85.6 | BMA(66.7) | TBAB(0.5) L101(0.33) | 2.8 | 176, 184 | 48 | 1870 | 20 | 920 |
| 5 | 85.6 | BMA(100) | TBAB(0.5) L101(0.33) | 1.5 | 71, 74 | 26 | 870 | 10 | 390 |
| 6 | 85.6 | BMA(50) TMPTMA(50) | TBAB(0.5) L101(0.33) | 4.85 | 187 | | | | |

| Experiment No. | BTDA (phr) | Monomer (phr)[a] | Catalyst/ Initiator (phr)[b] | R.T. Ten. Str., MPa | R.T. Ten. Mod., MPa | R.T. Ten. Elong., % | 149° C. Ten. Str., MPa | 149° C. Ten. Mod., MPa | 149° C. Ten. Elong., % |
|---|---|---|---|---|---|---|---|---|---|
| 1 | 85.6 | BMA(11.1) | TBAB(0.5) L101(0.33) | 19 | 3810 | 0.5 | 16 | 1960 | 0.9 |
| 2 | 85.6 | BMA(25) | TBAB(0.5) L101(0.33) | 14 | 2770 | 0.5 | 7 | 1560 | 0.5 |
| 3 | 85.6 | BMA(42.8) | TBAB(0.5) L101(0.33) | 22 | 2380 | 0.9 | 10 | 1370 | 0.7 |
| 4 | 85.6 | BMA(66.7) | TBAB(0.5) L101(0.33) | 26 | 1800 | 1.6 | 11 | 970 | 1.3 |
| 5 | 85.6 | BMA(100) | TBAB(0.5) L101(0.33) | 15 | 840 | 2.3 | 6 | 410 | 1.9 |
| 6 | 85.6 | BMA(50) TMPTMA(50) | TBAB(0.5) L101(0.33) | | | | | | |

[a]Epoxy Resin A (100 phr) used as base for all formulations. All samples cured 2 hours at 150° C.
[b]BMA = n-butyl methacrylate;
TMPTMA = trimethylolpropane trimethacrylate.
[c]ETPPI = ethyltriphenylphosphonium iodide;
TBAB = tetrabutylammonium bromide;
L101 = Lupersol 101 (2,5-dimethyl-2,5-bis(t-butylperoxy)hexane).

TABLE IV

| Experiment No. | Monomers (phr) | Catalysts (phr) | Initial Viscosity Pa·s | HDT 264 psi (°C.) | R.T. Flex Str., MPa | R.T. Flex Mod., MPa | 149° C. Flex Str., MPa | 149° C. Flex Mod., MPa |
|---|---|---|---|---|---|---|---|---|
| 1 | IBMA(25) | ETPPI(0.5), L101(0.2) | | 158.5, 160 | | | | |
| 2 | IBMA(20), TTEGDMA(5) | TBAB(1), L101(0.5) | | 157.4 | | | | |
| 3 | IBMA(20), PETA(5) | ETPPI(0.5), L101(0.2) | | 159, 159.5 | | | | |
| 4 | IBMA(15), PETA(10) | ETPPI(0.5), L101(0.2) | | 174.6, 178.6 | | | | |

TABLE IV-continued

| | | | | | | | | |
|---|---|---|---|---|---|---|---|---|
| 5 | IBMA(10), PETA(15) | ETPPI(0.5), L101(0.2) | | 185.1, 184.6 | | | | |
| 6 | IBMA(5), PETA(20) | ETPPI(0.5), L101(0.2) | | 177.7, 183.6 | | | | |
| 7 | PETA(25) | ETPPI(0.5), L101(0.2) | | 177.8, 177.5 | | | | |
| 8 | Styrene(25) | ETPPI(0.5), L101(0.2) | | 170, 174 | | | | |
| 9 | BMA(25) | TBAB(0.5), L101(0.2) | 0.85 | 122 | 96 | 2650 | 42 | 1280 |
| 10 | BMA(20), TMPTMA(5) | TBAB(0.5), L101(0.2) | 1.04 | 131 | 122 | 3110 | 43 | 1230 |
| 11 | BMA(20), PETA(5) | TBAB(0.5), L101(0.2) | 1.11 | 140 | 105 | 2930 | 52 | 1380 |
| 12 | BMA(15), TMPTMA(10) | TBAB(0.5), L101(0.2) | 2.5 | 143 | 94 | 3230 | 56 | 1600 |
| 13 | BMA(15), PETA(10) | TBAB(0.5), L101(0.2) | 3.8 | 178 | 114 | 3080 | 63 | 1810 |
| 14 | BMA(10), TMPTMA(15) | TBAB(0.5), L101(0.2) | 7.3 | 167 | 106 | 3290 | 67 | 1940 |
| 15 | Styrene(25) | TBAB(0.5), L101(0.2) | 0.63 | 165 | 131 | 3210 | 54 | 1420 |

| Experiment No. | Monomers (phr) | Catalysts (phr) | R.T. Tensile Str., MPa | R.T. Tensile Mod., MPa | R.T. Tensile Elong., % | 149° C. Tensile Str., MPa | 149° C. Tensile Mod., MPa | 149° C. Tensile Elong., % |
|---|---|---|---|---|---|---|---|---|
| 1 | IBMA(25) | ETPPI(0.5), L101(0.2) | | | | | | |
| 2 | IBMA(20), TTEGDMA(5) | TBAB(1), L101(0.5) | | | | | | |
| 3 | IBMA(20), PETA(5) | ETPPI(0.5), L101(0.2) | | | | | | |
| 4 | IBMA(15), PETA(10) | ETPPI(0.5), L101(0.2) | | | | | | |
| 5 | IBMA(10), PETA(15) | ETPPI(0.5), L101(0.2) | | | | | | |
| 6 | IBMA(5), PETA(20) | ETPPI(0.5), L101(0.2) | | | | | | |
| 7 | PETA(25) | ETPPI(0.5), L101(0.2) | | | | | | |
| 8 | Styrene(25) | ETPPI(0.5), L101(0.2) | | | | | | |
| 9 | BMA(25) | TBAB(0.5), L101(0.2) | 73 | 2930 | 4.7 | 19 | 1030 | 5.5 |
| 10 | BMA(20), TMPTMA(5) | TBAB(0.5), L101(0.2) | 68 | 3020 | 3.9 | 23 | 1120 | 6.3 |
| 11 | BMA(20), PETA(5) | TBAB(0.5), L101(0.2) | 43 | 3120 | 1.6 | 26 | 1590 | 5.5 |
| 12 | BMA(15), TMPTMA(10) | TBAB(0.5), L101(0.2) | 57 | 2510 | 4.6 | 27 | 1380 | 5.5 |
| 13 | BMA(15), PETA(10) | TBAB(0.5), L101(0.2) | 66 | 2840 | 4.3 | 32 | 1560 | 4.9 |
| 14 | BMA(10), TMPTMA(15) | TBAB(0.5), L101(0.2) | 54 | 2860 | 2.7 | 33 | 1660 | 3.9 |
| 15 | Styrene(25) | TBAB(0.5), L101(0.2) | 77 | 3160 | 4.2 | 26 | 1190 | 5.4 |

TABLE V

| Experiment No. | Monomer | Resin/Monomer w/w | Lupersol 101 (g/100 g Resin) | HDT 264 psi (°C.) | R.T. Flex Str., MPa | R.T. Flex Modulus, MPa | 149° C. Flex Str., MPa | 149° C. Flex Mod., MPa | R.T. Tensile Str., MPa |
|---|---|---|---|---|---|---|---|---|---|
| 1 | Vinyl Acetate | 90/10 | 0.2 | 150 | b | | | | |
| 2 | Vinyl Acetate | 80/20 | 0.2 | 119, 119 | b | | | | |
| 3 | Vinyl Acetate | 90/10 | 1.0 | 166, 170 | b | | | | |
| 4 | Vinyl Acetate | 80/20 | 1.0 | 142, 144 | b | | | | |
| 5 | Isoprene | 90/10 | 0.2 | 171, 169 | b | | | | |
| 6 | Isoprene | 80/20 | 0.2 | 167, 169 | b | | | | |
| 7 | N—Vinylpyrrolidone | 90/10 | 0.2 | 165 | c | | | | |
| 8 | N—Vinylpyrrolidone | 80/20 | 0.2 | 109, 111 | d | | | | |
| 9 | Diallyl Phthalate | 90/10 | 0.2 | 135, 140.5 | 87 | 3470 | 24.3 | 858 | 63.5 |
| 10 | Diallyl Phthalate | 80/20 | 0.2 | 105, 109 | 82 | 3440 | 4.7 | 78 | 61.3 |
| 11 | Diallyl Phthalate | 90/10 | 0.6 | 150, 152 | 91 | 3580 | 32.8 | 1160 | 53.3 |
| 12 | Diallyl Phthalate | 80/20 | 1.2 | 136.5, 137 | 129 | 3620 | 24.2 | 905 | 64.4 |
| 13 | Diallyl Phthalate | 90/10 | 1.1 | 153, 154 | 115 | 3470 | | | 47.0 |
| 14 | Diallyl Phthalate | 80/20 | 2.5 | 147, 150 | 121 | 3490 | | | 75.6 |
| 15 | Triallyl Isocyanurate | 90/10 | 0.2 | 150, 150 | e | | | | |
| 16 | Triallyl Isocyanurate | 80/20 | 0.2 | 109.5, 113 | e | | | | |
| 17 | Triallyl Isocyanurate | 90/10 | 0.6 | 156.5, 157 | e | | | | |
| 18 | Triallyl Isocyanurate | 80/20 | 1.2 | 152, 152 | e | | | | |
| 19 | Triallyl Isocyanurate | 90/10 | 1.1 | 154, 157 | e | | | | |
| 20 | Triallyl Isocyanurate | 80/20 | 2.5 | 132, 150 | e | | | | |

| Experiment No. | Monomer | Resin/Monomer w/w | R.T. Tensile Modulus, MPa | R.T. Tensile Elong., % | 149° C. Tensile Str., (MPa) | 149° C. Tensile Mod., (MPa) | 149° C. Tensile Elong., % | Tg, °C. Rheometrics Disperse Phase (Resin Phase) |
|---|---|---|---|---|---|---|---|---|
| 1 | Vinyl Acetate | 90/10 | | | | | | |
| 2 | Vinyl Acetate | 80/20 | | | | | | |
| 3 | Vinyl Acetate | 90/10 | | | | | | |
| 4 | Vinyl Acetate | 80/20 | | | | | | |
| 5 | Isoprene | 90/10 | | | | | | |
| 6 | Isoprene | 80/20 | | | | | | |
| 7 | N—Vinylpyrrolidone | 90/10 | | | | | | |
| 8 | N—Vinylpyrrolidone | 80/20 | | | | | | |
| 9 | Diallyl Phthalate | 90/10 | 3440 | 2.5 | 13.6 | 681 | 8.1 | 96,162 |
| 10 | Diallyl Phthalate | 80/20 | 3200 | 2.9 | 29 | 48.3 | 6.8 | 70,150 |
| 11 | Diallyl Phthalate | 90/10 | 3190 | 1.9 | | | | 100,170 |
| 12 | Diallyl Phthalate | 80/20 | 3320 | 2.7 | 13.5 | 592 | 13.1 | 95,170 |
| 13 | Diallyl Phthalate | 90/10 | 3330 | 1.7 | | | | |
| 14 | Diallyl Phthalate | 80/20 | 3300 | 3.4 | | | | |
| 15 | Triallyl Isocyanurate | 90/10 | | | | | | |
| 16 | Triallyl Isocyanurate | 80/20 | | | | | | |

TABLE V-continued

| | | |
|---|---|---|
| 17 | Triallyl Isocyanurate | 90/10 |
| 18 | Triallyl Isocyanurate | 80/20 |
| 19 | Triallyl Isocuanurate | 90/10 |
| 20 | Triallyl Isocyanurate | 80/20 |

[a]All castings were based on Epoxy Resin B and contained 50 phr TMA and 0.5 phr ETPPI. Cure cycle: 2 hr at 150° C.
[b]Casting not prepared because of volatility of monomer.
[c]Casting could not be molded because of high viscosity.
[d]Casting very brittle with many bubbles.
[e]Casting contained many bubbles and shattered on cooling.

TABLE VI

| Experiment No. | Monomer | Resin/Monomer (w/w) | Catalysts (phr)[b] | HDT 264 psi °C. | R.T. Flex Str, MPa | R.T. Flex Mod., MPa | 149° C. Flex Str., MPa | 149° C. Flex Mod., MPa | R.T. Ten, Str., MPa | R.T. Ten, Mod. MPa | R.T. Ten, Elong. % | 149° C. Ten, Str. MPa | 149° C. Ten, Mod. MPa | 149° C. Ten, Elong. % | Notched Izod, J/M |
|---|---|---|---|---|---|---|---|---|---|---|---|---|---|---|---|
| 1 | Methyl Methacrylate | 90/10 | ETPPI(0.5), L101(0.2) | 167, 167 | | | | | | | | | | | |
| 2 | Methyl Methacrylate | 80/20 | ETPPI(0.5), L101(0.2) | 165, 168 | | | | | | | | | | | |
| 3 | Butyl Acrylate | 80/20 | TBAB(0.5), L101(0.5) | 176 | 82 | 2440 | 53 | 1550 | 42 | 2420 | 2.3 | 26 | 1430 | 3.6, 3.8 | |
| 4 | Butyl Acrylate | 90/10 | ETPPI(0.5), L101(0.2) | | 76 | 3120 | | | 43 | 2900 | 1.7 | | | | |
| 5 | Butyl Acrylate | 90/10 | ETPPI(0.5), L101(0.2) | 172, 175 | | | | | | | | | | | |
| 6 | Butyl Acrylate | 80/20 | ETPPI(0.5), L101(0.2) | 157, 159 | | | | | | | | | | | |
| 7 | Butyl Acrylate | 80/20 | ETPPI(0.5), L101(0.2) | 173, 174 | | | | | | | | | | | |
| 8 | Butyl Acrylate | 80/20 | ETPPI(0.5), L101(0.2) | | 101 | 2560 | | | 52 | 2270 | 4.2 | | | | |
| 9 | Isobutyl Methacrylate | 80/20 | ETPPI(0.5), L101(0.2) | 159, 160 | | | | | | | | | | | |
| 10 | Isobutyl Methacrylate | 80/20 | TBAB(0.5), L101(0.5) | 155 | 92 | 2760 | 42 | 1480 | 54 | 2770 | 3.1 | 20 | 1200 | 3.7, 5.4 | |
| 11 | Isobutyl Methacrylate | 80/20 | A464(1.0), L101(0.2) | 148 | 94 | 2580 | 37 | 1050 | 39 | 2430 | 2.4 | 17 | 1040 | 5.2 | |
| 12 | Butyl Methacrylate | 90/10 | TBAB(0.5), L101(0.33) | 163, 164 | 107 | 3080 | 47 | 1430 | 39 | 3040 | 1.5 | 22 | 1240 | 3.5 | 22 |
| 13 | Butyl Methacrylate | 80/20 | TBAB(0.5), L101(0.33) | 161, 165 | 98 | 2880 | 23 | 657 | 48 | 2400 | 3.3 | 10 | 355 | 7.1 | 26 |
| 14 | Butyl Methacrylate | 70/30 | TBAB(0.5), L101(0.33) | 158, 161 | 80 | 4040 | | | 53 | 2130 | 5.0 | | | | 24 |
| 15 | Butyl Methacrylate | 60/40 | TBAB(0.5), L101(0.33) | 152, 153 | 59 | 1661 | 22 | 601 | 31 | 1680 | 2.5 | | | | 17 |
| 16 | Butyl Methacrylate | 50/50 | TBAB(0.5), L101(0.33) | 142, 143 | 30 | 1124 | 15 | 459 | 20 | 1230 | 1.9 | 12 | 520 | 7.1 | 17 |
| 17 | Butyl Methacrylate/Trimethylolpropane Trimethacrylate (1:1) | 50/50 | TBAB(0.5), L101(0.33) | 145, 152 | 93 | 2640 | 30 | 807 | 43 | 2500 | 2.3 | 7.6 | 305 | 5.2 | 19 |
| 18 | Isodecyl Methacrylate | 80/20 | ETPPI(0.5), L101(0.2) | 147 | 65 | 2440 | 40 | 1340 | 55 | 2360 | 4.8 | 22 | 1220 | 3.5 | |
| 19 | Isodecyl Methacrylate | 80/20 | ETPPI(0.5), L101(0.2) | 163 | 55 | 2700 | 41 | 1600 | 30 | 2460 | 1.4 | | | | |
| 20 | Dodecyl Methacrylate | 80/20 | ETPPI(0.5), L101(0.2) | 166 | 49 | 2190 | 35 | 1360 | 13 | 2070 | 0.6 | 17 | 1150 | 2.0 | |
| 21 | Dodecyl Methacrylate | 80/20 | ETPPI(0.5), L101(0.2) | 170 | 52 | 2680 | 41 | 1590 | 34 | 2400 | 1.6 | 24 | 1470 | 2.2 | |
| 22 | Acrylonitrile | 90/10 | ETPPI(0.5), L101(0.2) | 163, 164 | | | | | | | | | | | |
| 23 | Acrylonitrile | 80/20 | ETPPI(0.5), L101(0.2) | 137, 138 | | | | | | | | | | | |
| 24 | Acrylonitrile | 90/10 | ETPPI(0.5), L101(1.0) | 167, 168 | | | | | | | | | | | |
| 25 | Acrylonitrile | 80/20 | ETPPI(0.5), L101(1.0) | 161, 165 | | | | | | | | | | | |
| 26 | Styrene | 80/20 | TBAB(0.5), L101(0.33) | 167, 167 | 97 | 3110 | 47 | 1370 | 48 | 2580 | 3.0 | 26 | 1390 | 3.6 | 28 |

Formulation:
Epoxy Resin A or B    300 g.
TMA                   150 g.
Monomer               Variable
Quaternary Compound   Variable
Lupersol 101          Variable

[b]ETPPI = ethyl triphenylphosphonium iodide.
TBAB = tetrabutylammonium bromide.
A464 = Adogen 464 (methyl tri ($C_8$–$C_{10}$) ammonium chloride).
L101 = Lupersol 101 (2,5-bis(t-butylperoxy)-2,5-dimethylhexane).
Formulations made with ETPPI contained Epoxy Resin B: others contained Epoxy Resin A.

What is claimed is:

1. A heat-curable, styrene-free, composition exhibiting high heat deflection temperatures and excellent physical properties comprising:
   (1) from about 30 to about 99 parts by weight of an epoxy compound containing at least one vicinal epoxy group,
   (2) from about 1 to about 70 parts by weight of a polyacrylate or polymethacrylate ester of a polyol,
   (3) from about 0.25 to about 2.0 stoichiometric equivalents based on the epoxy compound of a polycarboxylic acid anhydride,
   (4) an accelerating amount of an onium compound or a stannous salt of a monocarboxylic acid, and
   (5) a curing amount of an organic peroxide.

2. The composition of claim 1 wherein the epoxy compound is a glycidyl polyether of a polyhydric phenol.

3. The composition of claim 2 wherein the polyhydric phenol is 2,2-bis(4-hydroxyphenyl)propane.

4. The composition of claim 2 wherein the 2,2-bis(4-hydroxyphenyl)propane has been hydrogenated.

5. The composition of claim 1 wherein the polymethacrylate ester is trimethylolpropane trimethacrylate.

6. The composition of claim 1 wherein the polyacrylate ester is pentaerythritol triacrylate.

7. The composition of claim 1 wherein the polycarboxylic acid anhydride is trimellitic anhydride.

8. The composition of claim 1 wherein the polycarboxylic acid anhydride is 3,3',4,4'-benzophenone tetracarboxylic dianhydride.

9. The composition of claim 1 wherein the onium compound is a phosphonium or ammonium halide.

10. The composition of claim 9 wherein the phosphonium halide is ethyl triphenyl phosphonium iodide.

11. The composition of claim 1 wherein the stannous salt is stannous octoate.

* * * * *